United States Patent [19]

Dayvolt

[11] 4,271,291
[45] Jun. 2, 1981

[54] PROCESS FOR RECOVERING CELLULOSE ESTER FINES

[75] Inventor: Bradley H. Dayvolt, Chuckey, Tenn.

[73] Assignee: Eastman Kodak Company, Rochester, N.Y.

[21] Appl. No.: 172,911

[22] Filed: Jul. 28, 1980

[51] Int. Cl.$^3$ .............................................. C08B 3/26
[52] U.S. Cl. ........................................ 536/65; 536/58; 536/76; 210/703
[58] Field of Search .................. 536/58, 65, 76, 77; 210/608, 703, 704, 705, 706, 707, 221.2

[56] References Cited

U.S. PATENT DOCUMENTS

| | | | |
|---|---|---|---|
| 1,176,428 | 3/1916 | Callow | 210/221.2 |
| 1,717,223 | 6/1929 | Karlstrom | 210/703 |
| 2,162,379 | 6/1939 | Dole | 210/221.2 |
| 2,214,943 | 9/1940 | Tinsley | 536/76 |
| 3,870,635 | 3/1975 | Pounder | 210/221.2 |

FOREIGN PATENT DOCUMENTS 1004505  5/1947  France ................................ 210/221.2
2309365  9/1973  France ................................ 210/703
258780   1/1972  U.S.S.R. ............................. 210/703

OTHER PUBLICATIONS

Concentration et Separation des Molecules et des Particules par la Methode des Mousses Dogivon, Revue Scientific, vol. 79, 1941 613-619.

*Primary Examiner*—Ernest G. Therkorn
*Attorney, Agent, or Firm*—Malcolm G. Dunn; Daniel B. Reece, III

[57] ABSTRACT

Process for recovering entrained cellulose ester fines from scrubber-coolant water by forming a wet foam containing the fines, floating the wet foam upwardly in a vertically disposed foam flotation column and outwardly along a horizontal straight-line path from which liquid from the wet foam is drained and the fines are introduced in the form of a drier foam into a vessel for subsequent dissolving of the fines, with the horizontal straight-line path being pitched downardly from the horizontal plane.

5 Claims, 4 Drawing Figures

PROCESS FOR RECOVERING CELLULOSE ESTER FINES

DESCRIPTION

1. Technical Field

The present invention is directed to a process for recovering cellulose ester fines from scrubber-coolant water by an adsorptive bubble separation technique.

2. Background Art

In the manufacture of low melting point cellulose acetate butyrates, a fluid bed dryer is used because the low melting point (about 100° C. to about 125° C.) of the ester prevents the use of more conventional drying techniques. The fluidizing gas is cooled and cleaned in a scrubber/cooling tower arrangement. Attempts to reuse or dispose of the scrubber water that is used are complicated by the cellulose ester fines entrained in the scrubber water and result in the formation of a very stable foam. More specifically, these cellulose ester fines cause a very stable ester-water-air foam to form above the liquid level at any point where the scrubber water is allowed sufficient residence time to settle. Insufficient scrubber water flow rate in the scrubber water loop or scrubber water purge steam also causes a foam buildup in the scrubber tower.

An object of the present invention is to remove and recover cellulose ester fines from scrubber-coolant water in which the cellulose ester fines are entrained and thereby reduce or eliminate the foam disposal problem.

In the prior art, there are various mehtods of separation which are based on differences in properties. For instance, distillation is based upon differences in volatility, and liquid extraction is based upon differences in solubility. The invention hereindescribed concerns adsorptive bubble separation techniques, which are based upon differences in surface activity. Material, which may be in molecular form, colloidal form, or macroparticulate in size, is selectively adsorbed or attached at the surfaces of bubbles rising through the liquid, and is thereby concentrated or separated.

The below-discussed patents disclose some examples of adsorptive bubble separation techniques.

U.S. Pat. No. 2,162,379 discloses an upwardly inclined long conduit along which foam is forced to travel. The liquid drains by gravity from the bubbles of the foam along the path into spaced liquid chambers, thereby resulting in the bubbles becoming progressively thinner-walled, smaller and drier until the foam is discharged as a very dry, fine, stable foam "which hardly feels wet to the touch". Each liquid chamber communicates at its top with the upwardly inclined long conduit. Foam-forming ingredients are further separated from the liquid collected in each liquid chamber by providing a porous false bottom in the liquid chamber and a connection to an air supply to convert a small part of the collected liquid into foam and force the foam upwardly into the upwardly inclined long conduit. The drained liquid passes off to one location for subsequent processing while the resulting discharged dry foam in then suitably subjected to mechanical separation of its liquid and solid constituents.

U.S. Pat. No. 3,870,635 discloses an apparatus for clarifying an influent water by gas stimulated flotation of solid material. Influent water is supplied into a vertically disposed column or chamber at a location substantially spaced from the lower end of the chamber. Gaseous bubbles intermixed with carrier liquid are discharged to the chamber at a second location substantially spaced below the supply of the influent water into the chamber. The discharged gaseous bubbles rise in the chamber in cloud-like form to cause upward movement of solid material in the influent water while liquid flows downwardly through the chamber for subsequent removal from the chamber.

Bubble fractionation, which is also considered to be involved in this invention, occurs when a partial separation of components occurs within a solution, which results from selective adsorption of such components at the surfaces of rising bubbles. For instance, gas enters at the bottom of a chamber and bubbles up through the solution. The adsorbed solute is carried upwardly and is deposited at the top of the liquid as the gas exits.

In the book "adsorptive bubble separation techniques" edited by Robert Lemlich, Academic Press, New York (1972), it is mentioned on page 293, for instance, that a foam separation column should discharge a dry foam of low density in order to obtain a high volume reduction. Since the foam leaving the counter-current part of a foam column has a relatively high liquid content, a drainage section is necessary to promote drainage of liquid from the foam. For foam columns of small diameter it was found that vertical drainage sections with an increased cross-section to reduce the velocity of the foam are simple and effective. Drainage approaches equilibrium after several inches of vertical drainage since the downward liquid velocity, with respect to the foam, is opposed to the upward flow of foam. On the other hand, a horizontal drainage was found to be more effective than a vertical one for large-diametered columns. Drainage in a horizontal section was found to be not limited by a velocity equilibrium between the liquid and the foam. It should be particularly noted that the horizontal drainage section is shown in the book on page 294 as being elevated above the horizontal plane by at least 2 degress or greater.

My invention involves the use of a horizontal drainage section but, contrary to the disclosure in the book mentioned above, I found by experimentation that my invention was unexpectedly more effective when the drainage section is pitched downwardly instead of upwardly.

DISCLOSURE OF INVENTION

In accordance with the present invention, therefore, I provide a process for recovering cellulose ester fines from scrubber-coolant water in which the cellulose ester fines are suspended. The process involves continuously introducing the scrubber-coolant water into a vertically disposed column of liquid adjacent the upper end of the column at a location just below the liquid level of the liquid column, with the liquid in the column being comprised of previously-introduced scrubber-coolant water. Gas is continuously sparged into the lower end of the vertically disposed liquid column to generate gas bubbles. This produces a counter-current effect in which the generated gas bubbles, to which the cellulose ester fines will adhere to the layer of each gas bubble, will rise upwardly within the liquid column to form a wet foam above the liquid level while the liquid of the liquid column descends downwardly in the column. The wet foam is comprised of cellulose ester fines, gas and portions of the liquid. The wet foam is continuously formed, thereby forcing the resulting flowing wet foam upwardly and away from the liquid level. The resulting flowing wet foam is guided along a straight-line path extending generally in a horizontal plane above, to one side of, and away from the liquid column. The horizontal path is pitched downwardly from the horizontal plane. Liquid is removed from the wet foam while it is being guided along the downwardly straight-line path so as to form a drier foam comprised of about 25 to about 60% cellulose ester fines and about 75 to about 40% liquid, as measured on a gas-free basis. Finally, the drier foam is introduced into a vessel and the cellulose ester fines are dissolved in the vessel for subsequent recovery.

The liquid is preferably removed from the flowing wet foam by draining the liquid through a screened surface extending along the bottom of the downwardly inclined straight-line path. The path along which the flowing wet foam is guided is pitched about 3° below the horizontal plane.

The liquid removed from the flowing wet foam is returned to the vertically disposed liquid column, and the liquid descending downwardly in the vertically disposed liquid column is removed from the bottom of the liquid column.

BRIEF DESCRIPTION OF DRAWINGS

The details of my invention will be described in connection with the accompanying drawings, in which.

BEST MODE FOR CARRYING OUT THE INVENTION

Figure 1:
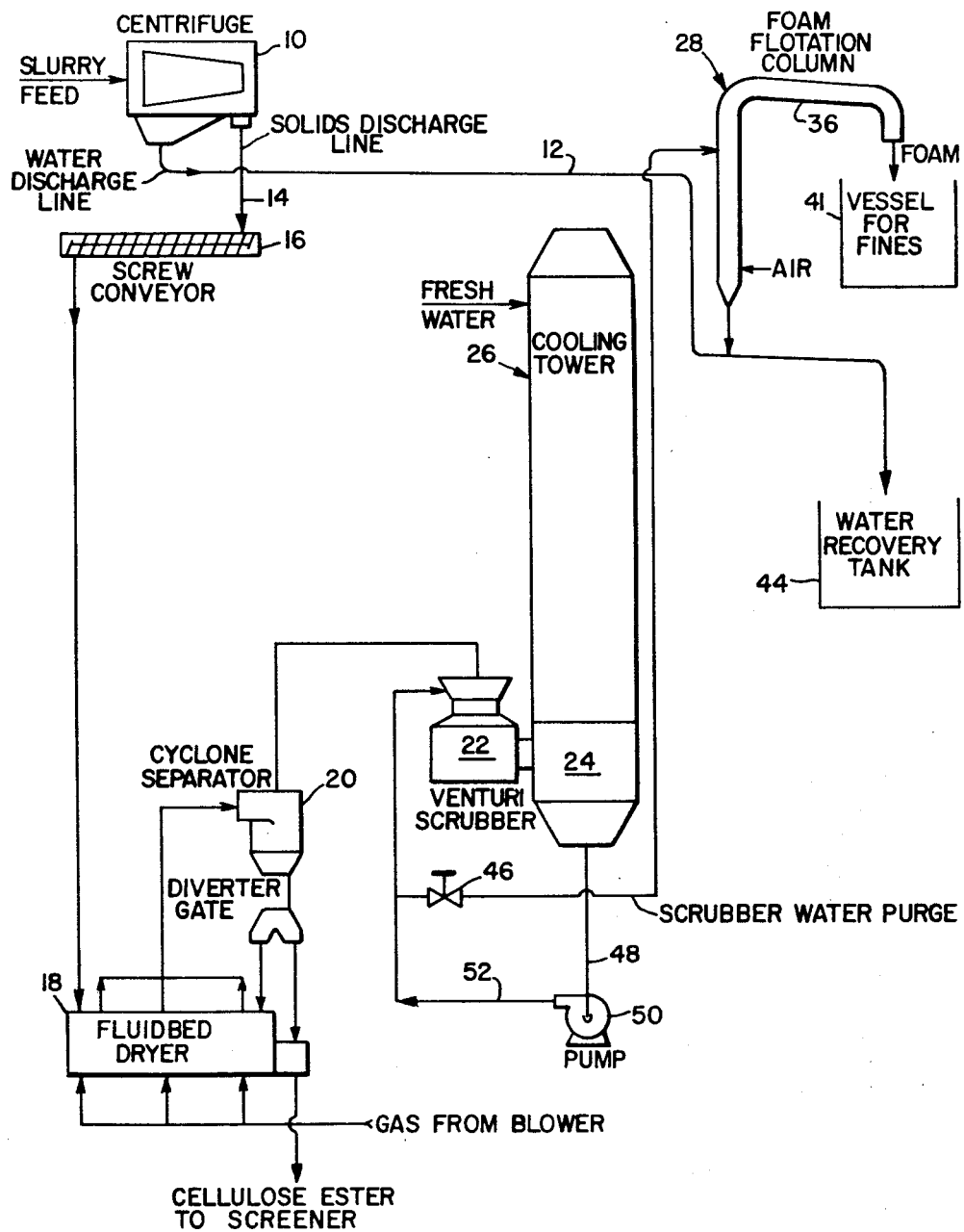
FIG. 1 is a schematic flow diagram showing a centrifuge, screw conveyor, fluid bed dryer, cyclone separator, scrubber-tower, recirculating pump, foam flotation column, vessel or tank for solubilized cellulose ester, and a water recovery tank.

With reference to the drawings, and initially to FIG. 1, from an incoming slurry feed washed cellulose ester is centrifuged in a continuous centrifuge 10. The water is discharged from the centrifuge along the discharge line 12 and the solids are discharged along line 14 to a screw conveyor 16 from which the cellulose ester falls by gravity into a fluid bed dryer 18. Inert gas used for the fluidizing medium in the fluid bed dryer is sent through a cyclone separator 20 to remove entrained solids which fall back into the dry end of the fluid bed dryer 18. The inert gas stream is further scrubbed in the venturi portion 22 and the lower portion 24 of the coolant tower 26 and then cooled in the remaining portion of coolant tower 26. The scrubber water collects the cellulose ester fines that do not separate in the cyclone separator 20. These cellulose ester fines cause a very stable ester-water-air foam to be formed above the liquid level at any point where the scrubber water is allowed sufficient residence time to settle. Insufficient scrubber water flow rate in the scrubber water loop (from bottom of scrubber portion of cooling tower 20 to the top of venturi-scrubber portion 18) or the scrubber water purge stream (from scrubber water loop) will also cause a foam buildup in the scrubber-coolant tower.

Figure 2:
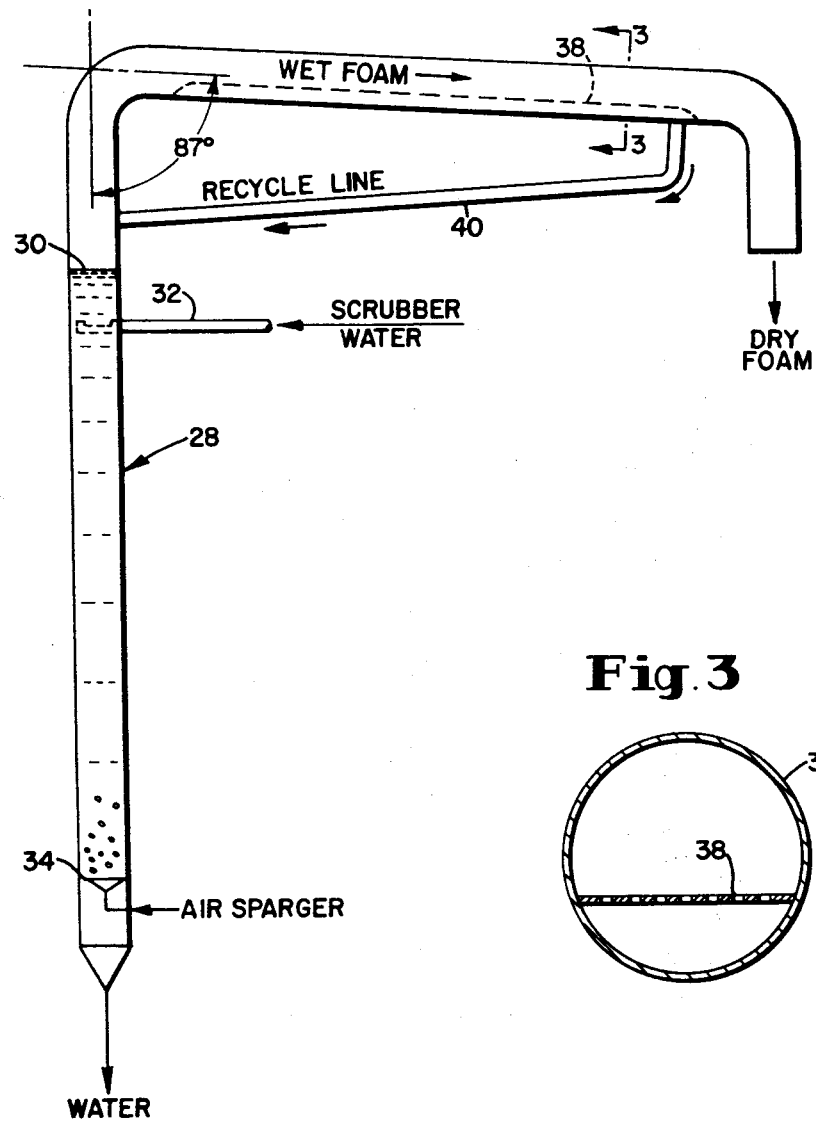
FIG. 2 is an enlarged view of the foam flotation column.
Figure 4:
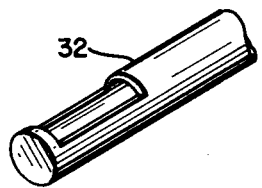
FIG. 4 is an enlarged fractional view of the feed inlet orifice to the foam flotation column.

In order to resolve the foam buildup problems and at the same time recover the cellulose ester fines for subsequent reuse, I provide a foam flotation column 28 into which and near he top thereof is fed the scrubber water purge stream, but below the liquid level, as shown at 30 (FIG. 2) by means of a feed inlet orifice 32, as shown in more detail in FIG. 4. Air is sparged into the bottom of the foam flotation column by sparger 34, as shown in FIG. 2, resulting in a counter-current flow in the foam floatation column. The feed inlet orifice 32, as shown in FIG. 4, is opened at the top only so that the incoming scrubber water purge stream so as to minimize disturbance of this countercurrent flow.

The sparged air in the foam flotation column results in the formation of air bubbles, which as they rise within the column, the cellulose ester fines adhere to the walls of the bubbles and are carried to the top of the column to form a wet liquid foam for subsequent flow upwardly and outwardly along the horizontal drainage section 36 of the foam flotation column 28.

Figure 3:
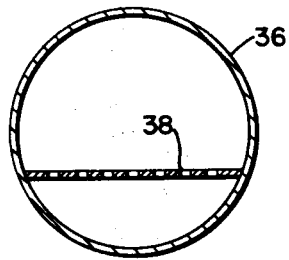
FIG. 3 is an enlarged cross-sectional view of the horizontal drainage section and perforated screen taken at 3—3 in FIG. 2.

The horizontal drainage section 36 is provided with a stainless steel screen 38 which is sealed at the opposite ends of the length of the screen and which also extends across the cross-section of the horizontal drainage section, as shown in FIG. 3. Initially the drainage section was pitched 3° above the horizontal plane, in the manner shown in the prior art on page 294 in the above-mentioned book edited by Robert Lemlich. It was later found, however, that when the drainage section was pitched below the horizontal plane, particularly at about 3°, the column performance appeared to improve significantly. The recycle flow rate visibly increased; the formed foam was more consistent in solids content (i.e. thickness); and the frequency and duration of periods when liquid underflowed the foam, i.e., undesirably flowed with the foam into the vessel for recovering the cellulose ester fines, decreased markedly.

As the wet foam flows along the downwardly pitched horizontal drainage section 36, liquid in the foam drains through the stainless steel screen 38 into conduit line 40 for subsequent return below the liquid level 30 of the liquid in the foam flotation column. As the liquid drains from the foam, the bubbles become smaller and drier and finally the drier bubbles with the adhering cellulose ester fines drain into a vessel or tank 41 containing clear solubilized cellulose ester where the fines are dissolved into the solubilized cellulose ester for subsequent reuse.

In the counter-current flow in the foam flotation column the liquid moving downwardly within the column eventually flows out the bottom of the tank to conduit line 42 for passage into the water recovery tank 44 for subsequent reuse.

A valve 46, which may be manually or automatically controlled, may be provided to enable the scrubber-coolant water to flow from the bottom of the coolant tower 26 along conduit line 48, via pump 50 and conduit line 52 for subsequent flow into the foam flotation column through the previously-mentioned feed inlet orifice 32.

The invention has been described in detail with particular reference to preferred embodiments thereof, but it will be understood that variations and modifications can be effected within the spirit and scope of the invention.

I claim:

1. A process for recovering cellulose ester fines from scrubber-coolant water in which the cellulose ester fines are suspended, the process comprising:

continuously introducing said scrubber-coolant water into a vertically disposed column of liquid adjacent the upper end thereof at a location just below the liquid level of the liquid column, the liquid in the column being comprised of previously-introduced scrubber-coolant water;

continuously sparging gas into the lower end of said vertically disposed liquid column to generate gas bubbles and consequently producing a counter-current effect in which the generated gas bubbles, to which said cellulose ester fines will adhere to the layer of each gas bubble, will rise upwardly within the liquid column to form a wet foam above said liquid level while the liquid of said vertically disposed liquid column descends downwardly in the column, said wet foam being comprised of said cellulose ester fines, gas and portions of said liquid;

continuously forming said wet foam to form a flow of wet foam, thereby forcing the resulting flowing wet foam upwardly and away from said liquid level;

guiding said resulting flowing wet foam along a straight-line path extending generally in a horizontal plane above, to one side of, and away from said liquid column, said path being pitched downwardly from said horizontal plane;

removing liquid from said wet foam while guiding said flowing wet foam along said downwardly pitched straight-line path to form a drier foam comprised of about 25 to about 60% cellulose ester fines and about 75 to about 40% liquid, as measured on a gas-free basis; and then introducing said drier foam into a vessel and dissolving said cellulose ester fines.

2. The process as defined in claim 1, wherein said liquid is removed from said flowing wet foam by draining said liquid through a screened surface extending along the bottom of said downwardly pitched straight-line path.

3. The process as defined in claim 1, wherein said straight-line path along which said flowing wet foam is guided is pitched about 3° below the horizontal plane.

4. The process as defined in claim 1, wherein said liquid removed from said flowing wet foam along said downwardly pitched straight-line path is returned to said vertically disposed liquid column.

5. The process as defined in claim 1, wherein said liquid descending downwardly in said vertically disposed liquid column is removed from the bottom of said liquid column.

* * * * *